(12) United States Patent
Harrison et al.

(10) Patent No.: US 8,457,942 B1
(45) Date of Patent: Jun. 4, 2013

(54) EXERCISE MONITORING UNIT FOR EXECUTABLE ARCHITECTURES

(75) Inventors: Gregory A. Harrison, Oviedo, FL (US); Salaheddine Saidi, St. Petersburg, FL (US); Russell (Russ) Chan, Sunnyvale, CA (US); Ann N. McCauslin, Aldie, VA (US); Howard S. Kern, Silver Spring, MD (US); Jeffrey S. Coffin, Germantown, MD (US); David C. Benjamin, Orlando, FL (US); Lawrence G. Elliott, Orlando, FL (US); Christopher A. Young, Quincy, MA (US); Stephen D. Peckham, Brighton, MA (US); Michael D. Stewart, Wyncote, PA (US); Mark E. Barbustiak, Atco, NJ (US)

(73) Assignee: Lockheed Martin Corporation, Orlando, FL (US)

( * ) Notice: Subject to any disclaimer, the term of this patent is extended or adjusted under 35 U.S.C. 154(b) by 187 days.

(21) Appl. No.: 12/908,597

(22) Filed: Oct. 20, 2010

Related U.S. Application Data

(62) Division of application No. 11/690,349, filed on Mar. 23, 2007, now abandoned.

(51) Int. Cl.
*G06F 17/50* (2006.01)
*G06G 7/62* (2006.01)

(52) U.S. Cl.
CPC . *G06F 17/50* (2013.01); *G06G 7/62* (2013.01)
USPC .......................................................... 703/13

(58) Field of Classification Search
USPC ........................................................ 703/13
See application file for complete search history.

(56) References Cited

U.S. PATENT DOCUMENTS

| 5,506,794 A * | 4/1996 | Lange ........................... 702/104 |
| 6,106,297 A | 8/2000 | Pollak et al. |
| 7,349,863 B1 | 3/2008 | Pena-Mora et al. |
| 2003/0078138 A1* | 4/2003 | Toyama ........................... 482/8 |
| 2005/0262397 A1* | 11/2005 | Fitzgerald et al. .............. 714/31 |

OTHER PUBLICATIONS

Fujimoto, R., "RTI-Kit V 0.2 Specification", Mar. 18, 1998, 18 pages.
Fujimoto, R., et al., "HLA RTI Performance in High Speed LAN Environments," Defense Evaluation and Research Agency, 1998, 11 pages.
Pawlowski, Tom et al., "Applying Executable Architectures to Support Dynamic Analysis of C2 Systems," The Mitre Corporation, 2004 Command and Control Research and Technology Symposium, Jun. 2004, 39 pages.

(Continued)

*Primary Examiner* — Dwin M Craig
(74) *Attorney, Agent, or Firm* — Withrow & Terranova, PLLC

(57) ABSTRACT

Systems and methods for parallel, discrete, simulations include functional capabilities to incorporate one or more human operators or actors into the simulation process. Such individuals can be presented situations where one or more decisions are necessary with respect to ongoing events. Entered decisions are incorporated into simulated events and activities being simulated. These in turn influence the behavior of those entities and also initiate the occurrence of other time-based processes. An architecture artifact or product can be automatically created or updated by recording how a sequence of events took place. The creation of sections of the DoDAF OV-6C Operational Event Trace architectural diagram, for the executable architecture model, can be automatically performed to dynamically provide event traces in response to a live exercise.

16 Claims, 9 Drawing Sheets

EMU User input screen during a training simulation.

OTHER PUBLICATIONS

Unknown, "FDK—Federated Simulations Development Kit", Georgia Tech Research Corporation, Jul. 20, 1998, updated Jan. 11, 2001, http://www.cc.gatech.edu/computing/pads/fdk.html, accessed Mar. 9, 2007, 12 pages.

Wang, B., et al., "A Petri Net Simulation Kernel With Extendibility, Convenient Modeling and Fast Simulation Engine," Proceedings of ICCT2003 (International Conference on Communication Technology), Apr. 9-11, 2003, accessed Sep. 28, 2009, pp. 1537-1539.

Non-Final Rejection mailed Oct. 1, 2009, for U.S. Appl. No. 11/690,349.

Final Rejection mailed May 20, 2010, for U.S. Appl. No. 11/690,349.

* cited by examiner

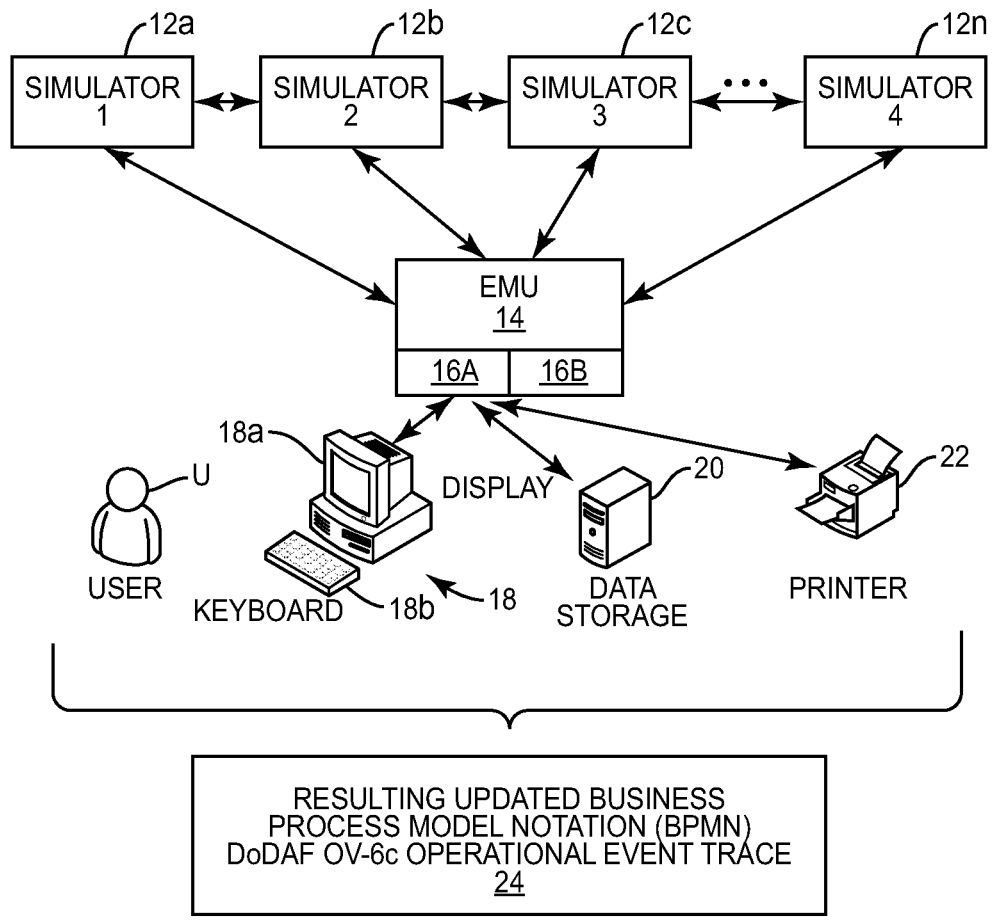
Figure 1. System with Exercise Monitoring Unit produces BPMN DoDAF OV-6c architectural process/Petri nodes and messages.

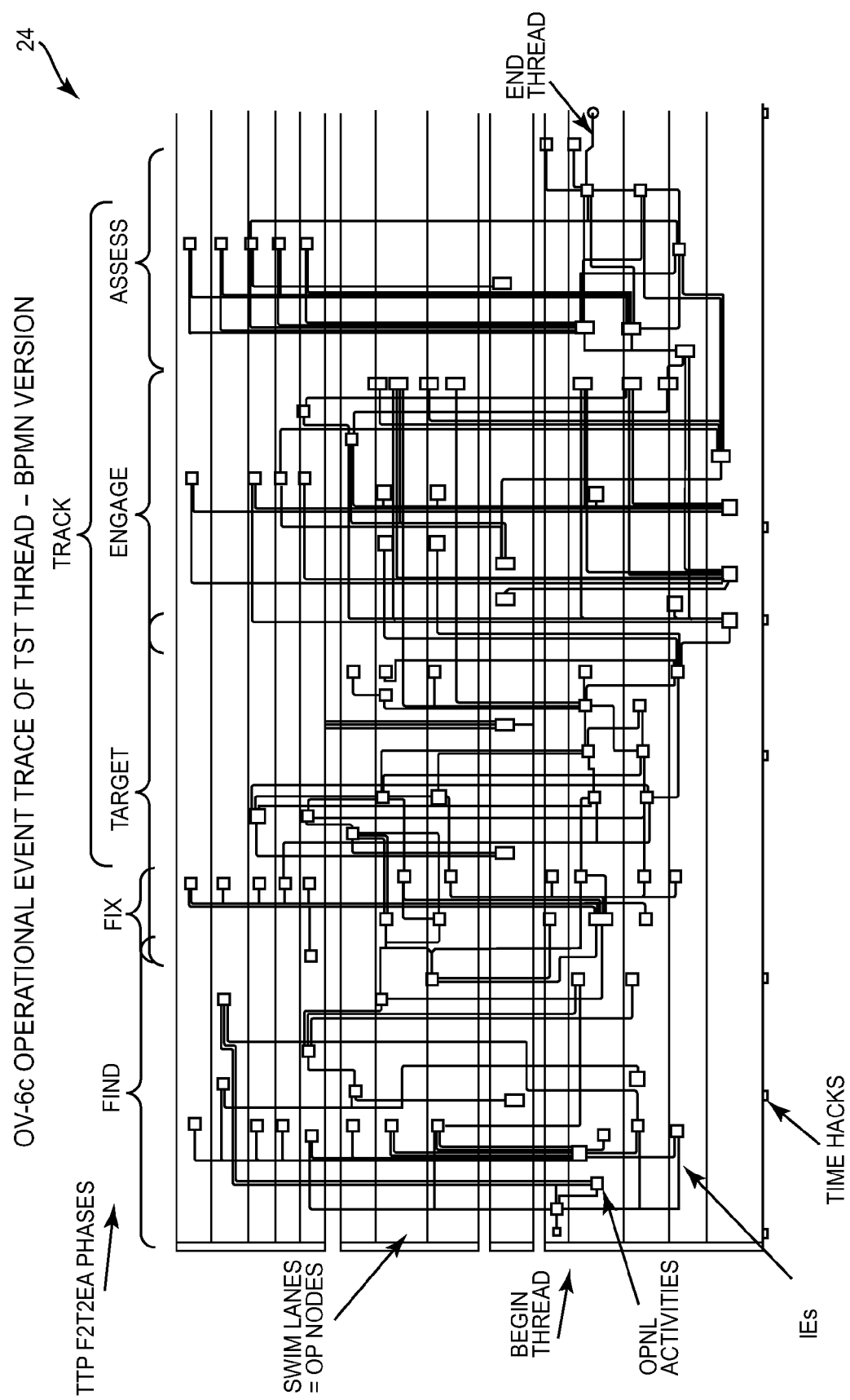
Figure 1A. Example of a business process model notation (BPMN) DoDAF OV-6c Operational Event Trace.

Figure 2. EMU User input screen during a training simulation.

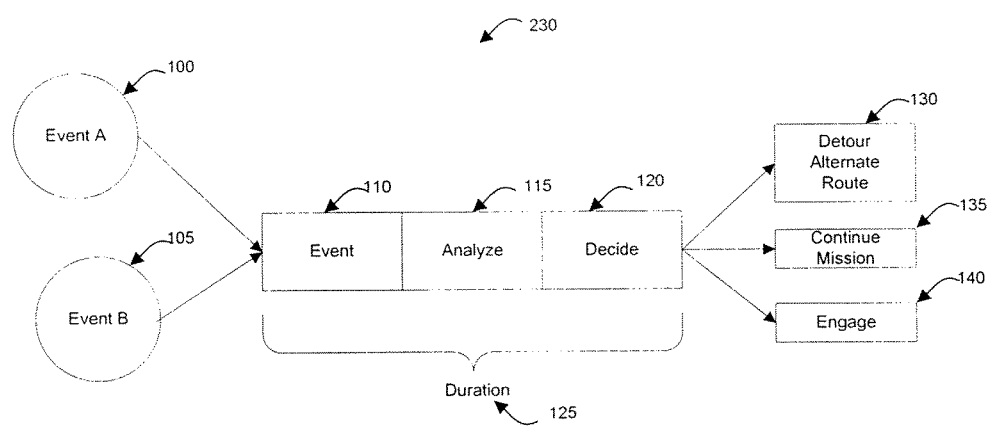
Figure 3. An automatically-created process/Petri Node for the executable architecture.

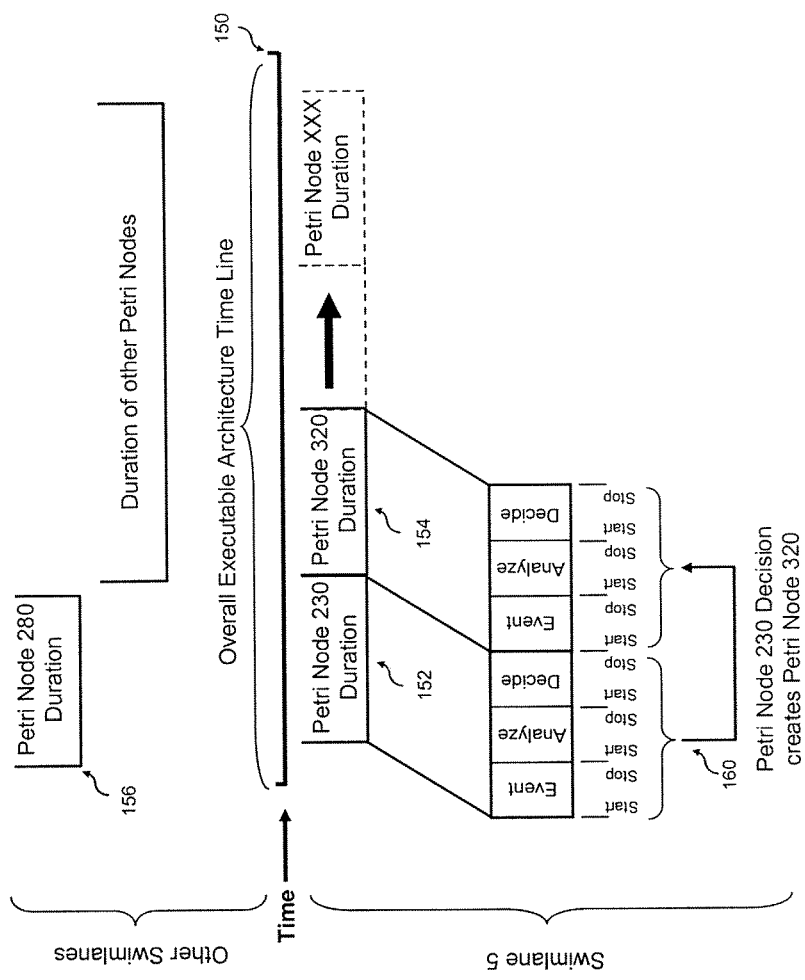
Figure 4. Time line of executable architecture process, with new nodes inserted from EMU.

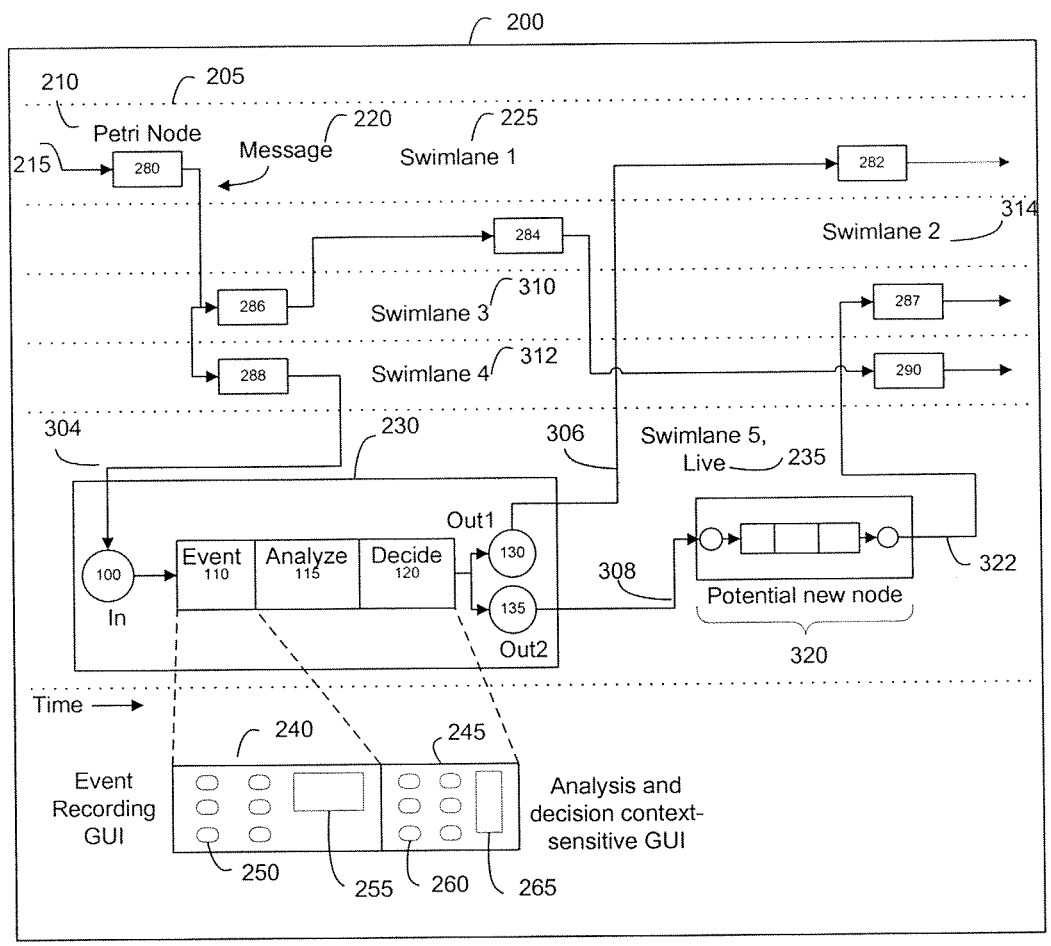
Figure 5. Flow diagram of executable architecture operation with EMU in Swimlane 5.

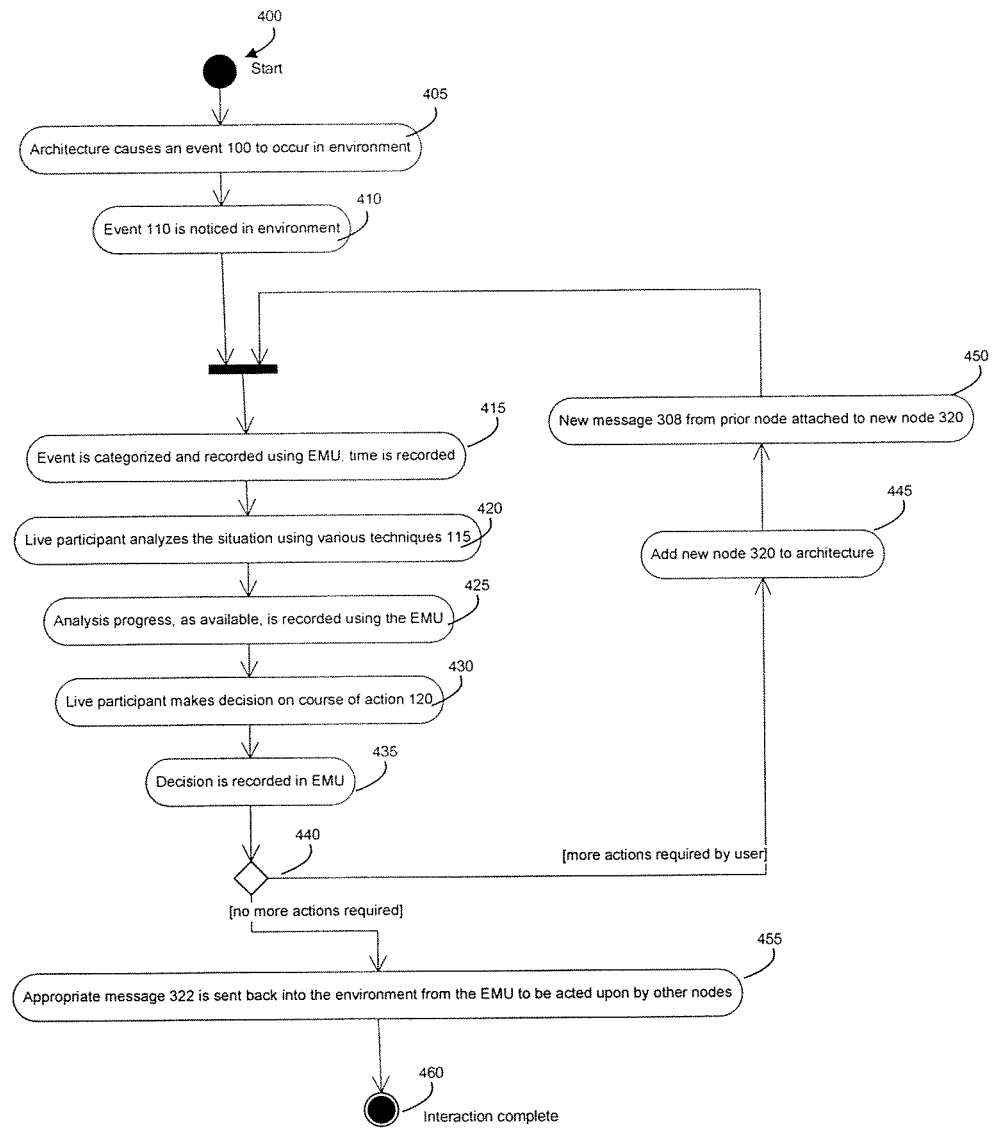
Figure 6. EMU operation to record, categorize and time an ongoing live exercise.

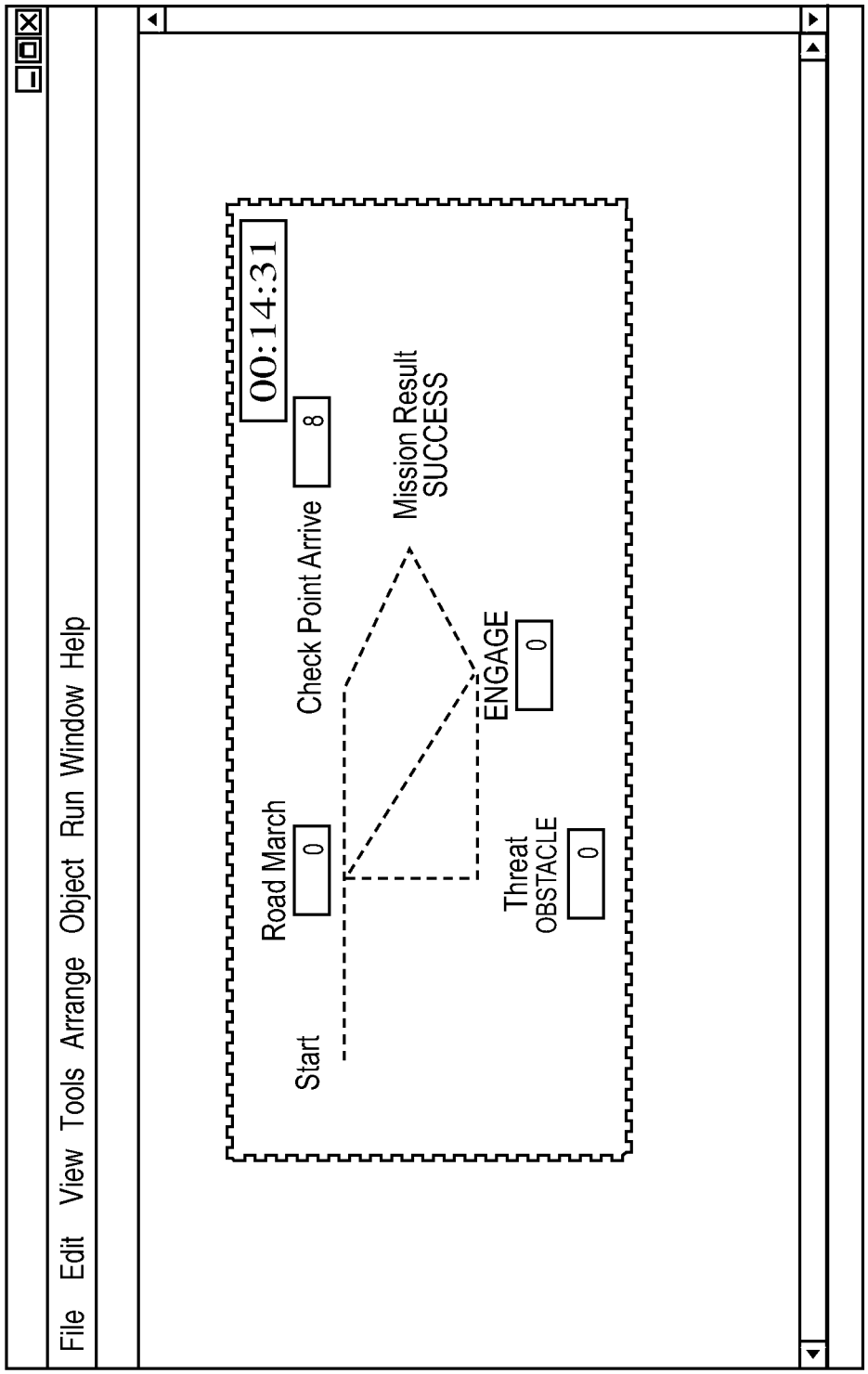
Figure 7. The Markovian potential state transitions in an ongoing exercise.

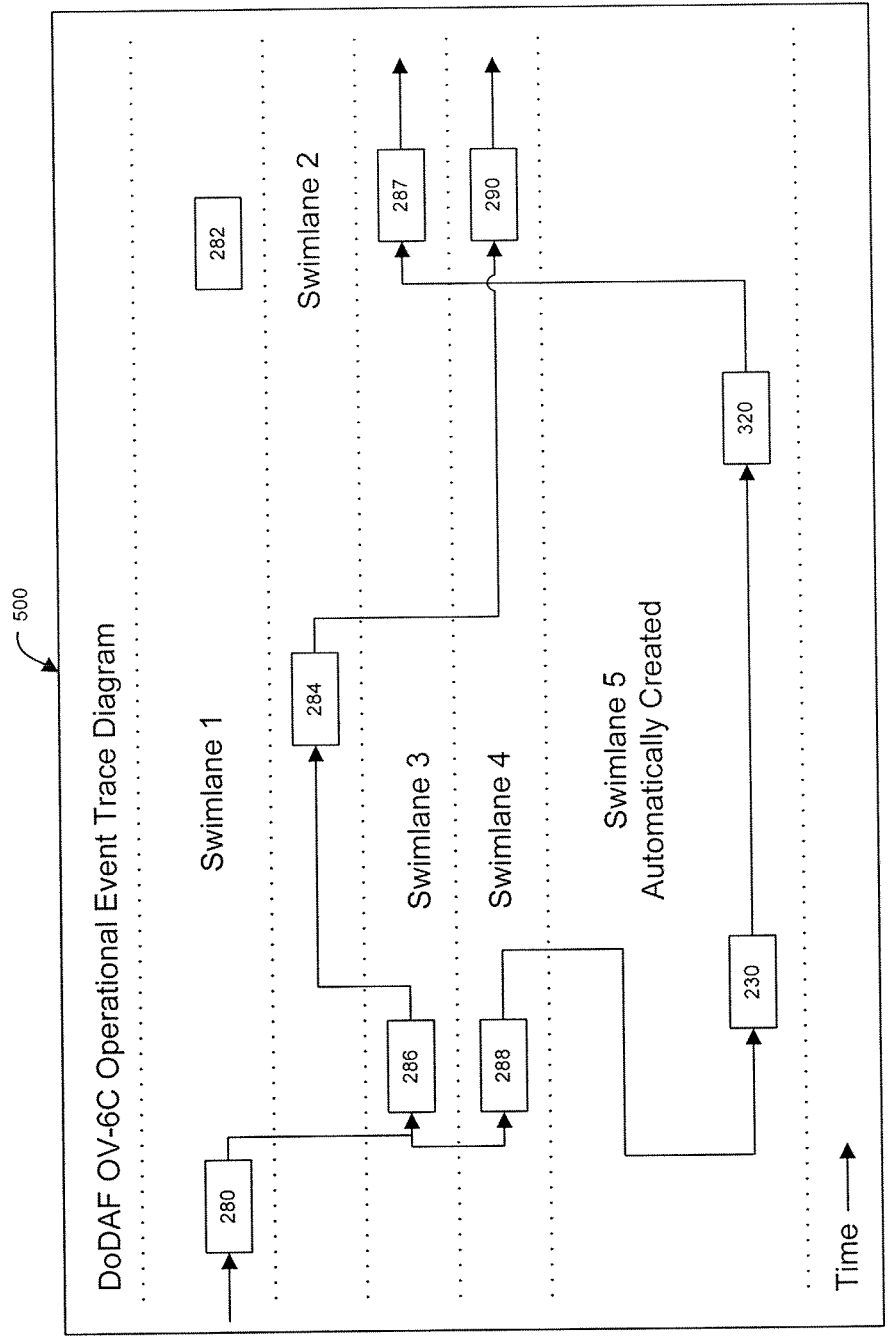
Figure 8. An abbreviated DoDAF OV-6c BPMN diagram resulting from use of the EMU to create Swimlane 5.

EXERCISE MONITORING UNIT FOR EXECUTABLE ARCHITECTURES

CROSS-REFERENCE TO RELATED APPLICATIONS

The present application is a divisional of U.S. patent application Ser. No. 11/690,349, filed Mar. 23, 2007, entitled "Exercise Monitoring Unit for Executable Architectures," which is hereby incorporated herein by reference in its entirety, and which claims the benefit of the filing date of U.S. Provisional Application Ser. No. 60/785,257 filed Mar. 23, 2006, entitled "Exercise Monitoring Unit for Executable Architectures."

FIELD

The invention pertains to systems of network simulators linked through a network and cooperating to simulate an architecture, as for example a Command, Control, Communications, Computer, Information, Surveillance, and Reconnaissance (C41SR) architecture developed under the DoD Architecture Framework (DoDAF). More particularly, it pertains to such systems which have capabilities to incorporate one or more human operators or actors into the process.

BACKGROUND

Large distributed systems can be simulated using multiple simulators linked through a network which cooperate to simulate the desired system or architecture. It has been recognized that the ability to simulate such architectures can produce more optimal results by enabling decision-makers to carry out, ahead of time, what-if type analysis. Such capabilities enable decision-makers to detect problems in the real-time operation of proposed systems or processes long-prior to implementation of an associated process or activity.

In a context of simulation of training exercises, various models of entities can be used which inter-operate with one another to test, verify and validate the static architecture of the system or process. One such system, known as Federated Executable Architecture Technology (FEAT) has been described in "Federated Executable Architecture Technology as an Enabling Technology for Simulation of Large Systems", Harrison et al., Proceedings of the SPIE, vol. 62270E, June 2006.

The executable architecture is 'federated' meaning that a simulation federation is set up so that multiple simulators can share information such as entity state, as long as the various simulators maintain a certain protocol in the communication in the federation, they can all work together. Executable architectures define one or more processes and carry out simulations thereof, which among the results enables a determination to be made as to elapsed time to carry out a respective process.

In the FEAT system, a mechanism is present to federate just about any type of simulator, including constructive simulators into the federation using a federated Petri-Net technology. A Petri-Net works by passing indicia or data around the system, for example, an object that represents a certain type of message.

In early, basic Petri-Nets, there are nodes that can communicate with each other by passing balls around the nodes. A node can't fire until it receives a ball. Subsequent revisions include colored Petri-Nets, where the nodes require a certain color ball before they fire and send their ball into the system to the next connected node. These Petri-Net systems were intended to help simulate the operation of parallel processes with multiple pathways.

In the Petri-Net version incorporated in FEAT the colored balls have been replaced with particular messages. Each message can carry extra payloads, such as location information. Time can also be incorporated in the Petri-Net, by requiring each node to wait for a predetermined time before releasing its message into the environment. All messages are transmitted via a High Level Architecture (HLA) network of a type usually used for virtual and constructive simulation object-oriented traffic. As long as a simulator provides the correct interface to the HLA network (This interface is described by a Federated Object Model (FOM)), then it can cooperate in the simulation.

While such systems and processes can be implemented to proceed substantially automatically without human intervention, it has also be recognized that introduction of one or more operators or actors into the process can not only be used to enhance the training experience of the respective individual or individuals but can also result in the incorporation of those individuals' real-world experiences into the simulation process. Thus, there is a continuing need to be able to incorporate operator or individual inputs into such systems in real-time.

Additionally, it would also be desirable to enable such persons or individuals to evaluate alternative courses of action during the process. It would also be desirable to be able to create or update an architecture by recording the simulation of events over a period of time during the ongoing process. Preferably, the actions of the participating individual become a part of the larger architecture, thus enhancing the realism of the simulation and also extending the current architecture.

BRIEF DESCRIPTION OF THE DRAWINGS

FIG. 1 is diagram of a system that embodies the invention;
FIG. 1A is an exemplary operational event trace diagram;
FIG. 2 is a screen that illustrates user inputs in a training simulation;
FIG. 3 illustrates aspects of a decision process in a training simulation;
FIG. 4 illustrates a time line associated with the process of FIG. 3;
FIG. 5 is a flow diagram that illustrates processing in accordance with the invention;
FIG. 6 illustrates the recording of a portion of an ongoing simulation process;
FIG. 7 shows a resulting Markov process diagram followed by the invention for the monitoring, documenting and recording simulation exercise courses of action; and
FIG. 8 shows an exemplary DoDAF OV-6c event trace diagram that would be generated through the use of the invention.

DETAILED DESCRIPTION

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

In a disclosed embodiment, a human actor or operator can be incorporated into the loop, or on-going process of a parallel, heterogeneous, simulation being carried out by a plurality of networked simulators such as the above-noted Federated Executable Architecture-type technology.

For example, embodiments of the invention incorporate a human interface to an executable architecture. A preferred form of such an interface would be a graphical user's interface (GUI).

Additionally, other embodiments can automatically create an architecture by recording the way that events actually happen for example by using Markov-type models of scenarios in the environment to help the user rapidly enter data concerning the actual events.

Executable architectures can model the interaction of a large system, with many human participants playing many different roles. In known executable architectures, these human participants have been simulated by objects in the simulation. The time durations that the humans require to do tasks are modeled, perhaps as just a simple delay or as a more complex model using location, motion, and virtual simulation to influence the amount of time it takes to complete the task. Unlike known systems, embodiments of the present invention inject actual human interaction into the simulation.

In the case of conducting a simulation for training the human in some task, the human is provided inputs corresponding to the state of the virtual world. This may occur in multiple ways, including text-to-voice presentations of messages received from other simulated human entities, 3 D visuals that depict a trace of the simulated environment as would occur at that human's position, or physical world training in a live environment using instrumented vehicles and participants.

The human actor or participant may be in a situation where he/she may have to make a decision, perhaps with respect to an event that is on-going or which has occurred. Disclosed embodiments of the invention provide a vehicle to input the decision to the simulation system. That decision or decisions can then wend its, their way through the various simulated entities/humans in the simulation, influencing their behavior and starting other time-based processes to occur. Eventually other results may occur, and be fed back to the human actor or trainee in the loop.

To facilitate the capture of events in the potentially fast-moving scenario, embodiments of the invention provide forward-looking user-interface choices to the operator. The system can include one or more models of the potential outcomes of decisions. These are preferably modeled as Markov probability models.

If the user or operator makes a certain decision, it may have one or many possible outcomes. The various outcomes are preferable presented visually (via the GUI) to the operator who can choose what to enter into the simulation system about what actually happened from the human's perspective. For instance, if the human is training to be a police officer, and the simulation has him/her approaching a vehicle, perhaps he/she decides to go to the passenger side, or the driver's side. That information goes into the simulation system, and influences the simulation.

The person entering the information into the GUI can, but need not be an actual participant in the exercise. He/she may be a person who is watching the actions and observing the response of the participant. Hence, embodiments of the system can receive inputs from a tablet pc device that allows context-sensitive, (through the use of Markov models of the possible decisions for a given event analysis) touch-screen access to the controls of an exercise monitoring unit (EMU). The context-sensitive GUI reflects Standard Operating Procedures (SOPs), doctrine or other guiding principles that dictate certain reactions to evolving events. The context-sensitive GUI can enable exploration of new operating procedures by changing the order of SOPs so that the new SOP can be injected into the simulation.

In a broader context, if the person is deciding battle orders from the ground, the duration he/she takes to perform certain tasks may be influenced by the tools at his/her disposal. Capturing the time durations for his/her decisions, and the decisions themselves into the simulation enables the simulation to test different scenarios with different configurations of the human's equipment to see if there is a preferred configuration.

When an exercise using the invention has completed, the results of the decisions and their associated times are included as new architectural nodes in a DODAF OV-6C Operational Event Trace of the exercise. Multiple nodes may have been generated to describe the actions recorded using the EMU.

Embodiments of the invention converse with the executable architecture using a messaging system. An EMU that embodies the invention can accept and transmit messages into the Petri-Net FOM and enters the Executable Architecture via the HLA network. It accepts a message, performs the desired action (such as allowing the live participant to perform and make decisions in the environment) and then sends its message out to the system. This enables realistic timing of the processing done by the participant to enter into the Executable Architecture, instead of just relying on some preprogrammed time delay as might have otherwise been programmed into the discrete simulator federate in the simulation. The live participant EMU federate thus can replace a node in the discrete simulation by accepting the same messages and sending out the same messages as the node that had previously been included in the discrete simulation. The DoDAF OV-6C diagram describes the nodes in the simulation, and the EMU can replace any of these using the Petri-Net FOM capabilities, thus enhancing the analyst's ability to dynamically create an accurate architectural rendition of a particular scenario.

Other embodiments of the system can create and store the current architecture representations automatically as the scenario progresses. This enables that architecture to be played back later, separately or as part of a larger simulation, helping to refine the executable architecture simulation with actual recorded data/behaviors/messages and actions. The stored architecture can subsequently be reviewed and/or portions can be printed or otherwise output. For example, DoDAF-OV-6C type diagrams which can be shared electronically or via hard copy to help describe how the system or exercise would be expected to run when executed.

FIG. 1 illustrates a system 10 which embodies the present invention. System 10 includes a plurality of networked simulators 12a, b . . . n, 14 which can communicate with one another via an appropriate network, for example, a computer network such as an intranet or an internet. Such networked simulators 12a . . . n can represent an embodiment of the Federated Executable Architecture Technology noted above. The networked simulator 14 can also function as the exercise monitoring unit. It can include a programmable processor 16a and associated control software 16b which can communicate with the on-going simulation being carried out by the members 12a . . . n in 14 as well as with human actor or user U via a graphical user interface and communication device 18.

Device 18 can include a display unit 18a, keyboard 18b as well as other forms of human compatible input/output devices. For convenience, the device 18 could be implemented as a tablet-type personal type computer having touch screen as well as other forms of laptop computers. Such graphical user interfaces are known to those of skill in the art and need not be described further.

A data storage unit 20, such as a disk drive or optical mass storage unit, is also coupled to processor 16a. Unit 20, as described below can store an on-going simulation for later use and replay. For example, portions of a stored simulation process can be retrieved from unit 20 and presented on display unit 18a.

The end result can be an updated DoDAF OV-6C Operational Event Trace diagram that represents the captured operational events of the overall system. A representative diagram 24 is illustrated in FIG. 1A. This diagram now includes the newly discovered events and their associated times, as recorded, interpreted and produced by the EMU.

FIG. 1A shows an outline of the processes, activities, and messages in an architecture design for a large system with many swimlanes of participants, all communicating and working together to carry out a detailed mission. The timeline for the mission proceeds from left to right on the diagram. A swimlane represents an agency, organization, or participant responsible for carrying out some aspect of the architecture. For example, swimlanes could represent an airborne command center (AWACS), special operations team, an industrial management organization, or a regional monitoring system.

The swimlane participants or Op Nodes have previously been simulated in a discrete simulator. The boxes in the swimlanes correspond to processes and activities that take place by that participant, generally producing a result, and consuming time. In this architecture a result is shown by a message line that leaves one process/activity and goes to one or more other processes/activities. In the discrete simulation of the executable architecture, each process/activity is represented by a Petri Node that waits for certain messages, performs a task, taking a certain amount of time, and producing a resulting message. Some nodes in FIG. 1a are not shown as producing messages, but would if a more expanded representation of the architecture was modeled. To create this diagram is very time consuming, and requires analysts to interview the participants, monitor their progress and capture the data in the OV-6c diagram manually.

An automated tool is provided hereby to assist in the creation of the OV-6c representation of the system. It allows a 'live' participant to interact with the messages that flow through the system, and to replace a given swimlane in the architecture. The actual decisions, messages, steps that the live participant takes, and the time durations are transformed by the present system and method into new process/activity/Petri nodes and messages that provide an update to the OV-6c diagram. The update to the diagram can be performed through analyst review of the operational event traces recorded by the invention, or may be loaded into an OV-6c generating tool automatically.

As the exercise progresses, process/activity/Petri nodes are automatically created to describe the steps taken by the participant by using a human-computer interface in the form of a graphical user interface, but other input capabilities are also available to the invention, including the ability to pass location information into the executable architecture that it can receive from other computer resources that are involved in the simulation. This would allow the reporting of the position of the participant, as well as their velocity and other data if it is pertinent to the execution of the architecture of the scenario.

To facilitate the rapid recording of live exercise events and decisions, internal Markov models, pertinent to the expected actions and events to be encountered by the participant, are pre-programmed into the EMU 14, and used to automatically change sections of the GUI input screens to allow rapid, reflexive operation of the invention, enhancing the ability to be a useful tool for the recording of real-time activity by the live participant. When the exercise is complete, the new set of OV-6c process/activity/Petri nodes and messages accurately describe the actual steps and interactions of the participant in the context of the rest of the executable architecture that is executing the other swimlanes of the OV-6c diagram. The updated OV-6c diagram can be analyzed to help determine ways to improve the performance of the entire system, and the accurate information helps to facilitate rapid changes to the architecture in a 'what if' type of architecture-improvement effort.

One of the advantages of the system 10 is the introduction of a human participant or actor U who can respond to developing events and make real-world decisions via the device 18. As a result, executable architectural entities can be created and represented in XML-type code as a recording of the exercise. It will be understood that the characteristics and particular computer language used for this function are not limitations of the present invention.

Figure 2:
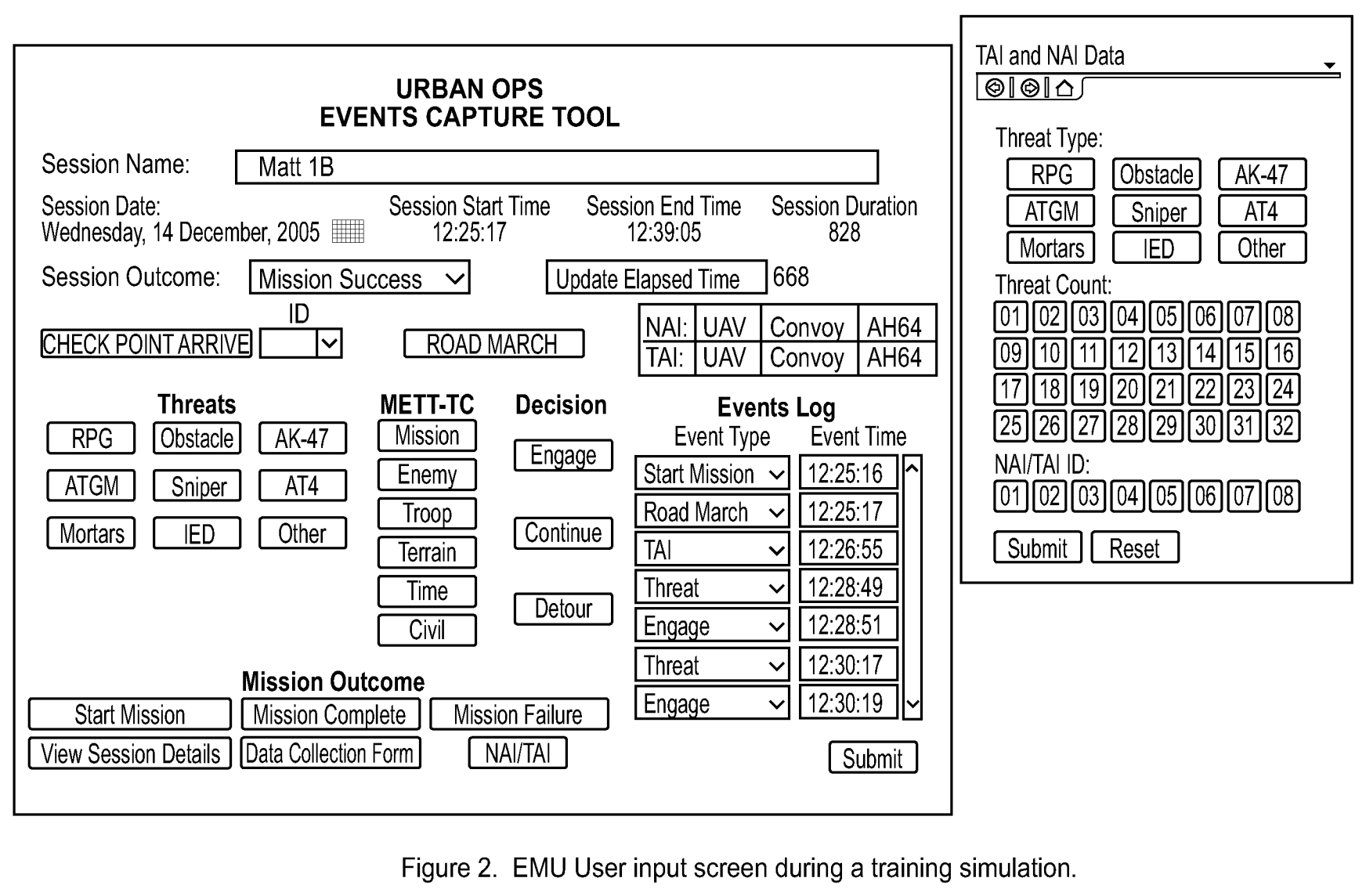

An example of a screen for a military training exercise is shown in FIG. 2 and illustrates an events capture tool. This figure shows context-sensitive events (Threats, METT-TC, Decision, NAI and TAI) represented by pushbuttons so that selection (clicking the button) of the event triggers other courses of action to start. NAI: Named Area of Interest and TAI, Targeted Area of Interest refers to when some participant (in this case, UAV pilot, Convoy members or AH64 pilot) enters a geographical region and either observes the area or fires at the target.

When threats are encountered, the appropriate threat button can be clicked, by actor or operator U, at which point a decision is expected by the architecture. Fine-grained analysis of what went into the decision is possible to record by clicking on the METT-TC buttons, showing progress of the decision making cycle, as the various factors that enter into the decision making process are considered: Mission Enemy, Troop, Terrain-Time, Civil. Then the decision is made, Engage, Continue, or Detour.

The time that transpired between the initial threat event and the decision (resulting action) is recorded. The various events go into an events log, and an underlying architecture is created as the activities progress through the scenario. For instance, if the decision was to engage the enemy, then there would be a new 'enemy engage' activity node entered into the growing architecture.

The actual times of the response (decision cycle) is an important supporting feature. Actual activity times can then be used in later simulations, and for customization of future courses of action simulations involving this particular commander, or other for activities having other similar characteristics to this situation.

As command decisions are made, certain courses of action are thus defined. These courses of action can be defined using Markov models, where states are derived with particular probabilities. These probabilities can be set at 100% if needed, or modified based upon experience in the local battlefield. The system evolution through time, as evidenced in the executable architecture then proceeds along paths described in the Markov model course of action identified by the commander. A description of the internal Markov model operation is provided in the discussion of FIG. 7. The model is used to construct a set of executable architecture nodes in a co-simulation environment to provide rapid data collection and decision result data input, and also enable plan monitoring.

FIG. 3 shows the processing of the federated EMU 14 in the executable architecture. The EMU is substituting for a process/activity/Petri node in the discrete simulator, such as node 230 in FIGS. 4, 5, and 8. The EMU is representative of the cognitive process of the command decision making cycle.

Events 100 and 105 cause some change in the environment into which the participant is immersed. These changes are understood by the participant as a certain state of the environment, stimulating the conclusion that an event 110 has occurred. This may be a 'fired-upon' event, with information of the attack recorded via the EMU screens and GUI pushbuttons to help define the exact parameters of the event. The participant or actor analyzes the situation 115, and may take more detailed assessment actions, and these actions may be recorded on the GUI 18.

Additional Markov-model-triggered contextually appropriate auxiliary GUI screens could appear on the GUI in response to recording the event. Logic within the EMU 14 includes a set of probabilities of what decisions might be made, and what assessment steps might be taken based upon learned experience in the field, and training doctrine as to what to do in such as situation. The participant decides on an option 120. This choice is recorded in the EMU 14, triggering one of the output messages 130, 135, or 140 to be transmitted back into the executable architecture for the use of downstream processes/activities that are responsive to these particular messages and further prescreening takes place in accordance therewith. Depending on the choice, more architecture processes/activities may be added to describe and monitor new courses of action that the user has chosen.

FIG. 4 shows a top-level timeline for the executable architecture. In the time line 150, the overall progression of time is shown. Beneath this are the individual timelines 152 and 154, for two activity nodes in the executable architecture. These nodes are linked by a message such that process/activity 230 will complete processing before process/activity 320 (see FIG. 5) starts. The processing times of both processes/activities occurs concurrently with the processing of the total system architecture.

FIG. 5 illustrates an executable architecture 200.

Multiple swimlanes 225, 310, 312, 314, and 235 represent different entities or agencies being simulated. Petri Nodes 280, 282, 284, 286, 287, 288, 290, 230, and 320 are contained within these swimlanes. They represent processing that takes time and provides an output.

Nodes 230 and 320 are process/activity/Petri nodes in the system and are embodied in the EMU 14 containing structures, such as processor 16a, and executable software 16b to implement the processing described in the discussion of FIG. 3. In a representative execution of this architecture, a particular initial message 215 enters this architecture and goes to node 280.

The processing in node 280 consumes time, goes to completion and sends messages 220 to node 286 in swimlane 3 and node 288 in swimlane 4. In accordance with system communication protocol, node 288 in swimlane 4 sends a message 304 that causes events to occur in the environment, such as event 100 or event 105 from FIG. 3.

The participant U responds to the event 110. Responses are timed and recorded in the EMU node 230. The participant analyzes the situation 115 taking a certain amount of time, that is recorded by the EMU, and reaches a decision 120, which in this case can take one of two forms 130 or 135. In FIG. 5 choosing the first result 130 causes a networked message to be transmitted through the executable architecture of simulation 200 to reach node 282 for further processing. Had the user U chosen the other option 135, then a new node 320 would have been created in the executable architecture by the EMU and the process of monitoring and recording the user input would begin again for this new course of action. This continues until the course of action stimulated by message 304 is completely resolved by the user, and the processing of the final step of the solution represented by node 320 is complete. Node 320 then sends message 322 back into the rest of the ongoing simulation to trigger node 287 in Swimlane 3. Other nodes that may have been created in the course of resolving the situation may have had other directed messages transmitted into the system depending on the type of processing involved in the node.

The recording of observations of the participant is performed for each of the new nodes inserted into the architecture by the EMU using components 240 and 245 of the GUI, depending on the phase of the event response. During the observation of the categorization of the event 110, the event section 240 of the GUI is used by pressing buttons 250 and typing clarifying information in the text box 255. The results of the recording of the event cause the appropriate analysis and decision screen 245 to appear on the GUI, where analysis elements of the resulting decision can be entered using the buttons 260 and text box 265 for clarifying information.

The appropriate analysis and decision screen displays are determined by a Markov analysis of the possible response to the possible events. The likely responses for the given event are portrayed on the analysis and decision screen to facilitate rapid recording of the results. Choosing certain results may have the effect of continuing or adding new facets to the effort performed by the user in response to the event, and this results in new nodes being created in the architecture to describe and embody the time durations and information about the processing that occurs during that architectural node.

All inputs to the GUI have time stamps associated with them to facilitate creation of a section of executable architecture representing each facet of this section of the overall simulation. These times would be used for setting the time delay on a Petri Node in the discrete simulator section of the FEAT system in lieu of having the actual participant involved in the executable architecture.

FIG. 6 illustrates aspects of processing 400 in accordance with the invention. Initially, as in 405, the architecture causes an event to occur in the environment. As at 410, the event is noted.

As at 415, the event is characterized and recorded using the exercise monitor unit 14. The time is also recorded. As in 420, a live participant, such as actor U assesses the situation as appropriate using various techniques. As in 425 the assessment progress is recorded using the preferable context-sensitive user's interface.

The live participant or actor U, as in 430, makes a decision on a course of action. That decision is recorded in the EMU 14 as at 435. Depending on the decision recorded as of 435, the EMU will provide one of two responses 440. If more actions are required by the user to resolve the situation, then the EMU will add a new process/activity to the architecture, as at 445 in order to record, time, and represent the additional course of action being performed.

As in 450, a new message is created in the architecture to represent the flow of system state into the new process/activity, and the processing of this new process/activity begins again, as at 415. If, instead, the processing has been determined to be completed, an appropriate message is sent back into the environment from the EMU 14 as at 455.

FIG. 7 shows a type of state-transition diagram that is created for a particular exercise. Each vertex in this diagram corresponds to the creation of a new node or message in the OV-6c representation of the executable architecture. The system activity thread leaves the process/activity along the dotted lines at times that are governed by the events that happen in the simulation and the real world.

The indication that some processes/activities are only reachable through others lends itself to the Markov modeling concept behind the varying undercurrent states of the executing model. This may be expandable by attaching probabilities of leaving states along different lines, for a fuller Markovian model of the environment. These models can be tracked and modified based upon the location and the current state of the world where the simulation is taking place. The set of states here is only a small part of a potentially much larger simulation of the entire battle space, pertaining to the decisions of a certain commander, and acting with response to the pushback of the enemy.

Later after the exercise is completed, or at some later time, this section of the exercise can be analyzed or played back in an executable architecture fashion, executing the new process/activity/Petri nodes and messages in a discrete simulator, combined with the other architectural swimlanes. Different types of simulators, including discrete simulation and constructive simulation, where software simulates the actions of participants in a continuous-time instead of a discrete-time fashion have been previously used to execute architectures. Advantageously, the live participant, and the virtual participant (such as a participant driving a real-time simulator in a virtual environment) can participate in an ongoing executable architecture process. The higher-level architectural concepts, such as command, control, and categorized behavior and interpretation of the participants' intentions and actions also can become part of the recorded architecture.

Prior systems that allow the recording of the behavior of participants in a simulation exercise primarily record the motions, positions, and low-level actions such as shooting in a certain direction to be recorded and played back. Unlike the prior art, the present systems and methods enable higher-level concepts related to the exercise, such as C4ISR intelligence interactions to become part of the simulation. As a result, the simulation can become part of a wider intelligence effort to control, communicate, and jointly influence the results of the mission being simulated. As systems, such as defense systems, become more complicated, requiring global resource participation in the mission, a way to link these factions together in a larger simulation is important. In lieu of performing a costly and difficult joint simulation with hundreds of people simulating the other swimlanes in the architecture, when it may be important to train just certain participants/swimlanes, being able to link these certain participants with an executable architecture that provides stimulation and simulation of the rest of the swimlanes provides cost savings and expediency for training smaller units, while maintaining the responsiveness of a much larger theatre of participants through simulation. A link can also be provided into the simulation of the larger mission that allows separate training of individuals in a live or virtual environment.

The EMU stores all the events, the processing processes/activities, their descriptions, times and messages in data storage 20, and creates a complete representation of the user's steps in resolving the event that was inserted through the processing of the executable DoDAF OV-6C architecture. The DoDAF OV-6C architectural diagram is then produced in the executable architecture, including this vignette of user operation to provide a more accurate representation of the steps the user needed to resolve this aspect of the simulation and also a detailed representation of the times required to perform these steps.

One of the most difficult steps in creation of an executable architecture is the design of the DoDAF OV-6C Operational Event Trace, from which all the processes/activities and messages describing the interactions and processing in the system is created in the executable, computer-based processing of the simulation of the architecture. Especially difficult is the recording of the processing time of each process/activity. Embodiments of the invention can automate sections of development of the DoDAF OV-6C diagram. Activity processes/activities in the system can be automatically inserted along with descriptions of the processing that is occurring in each process/activity, as well as providing actual time durations that were recorded during the live execution of that segment of the architecture. FIG. 8 shows an abbreviated DoDAF OV-6C Operational Event Trace diagram 500 that could have resulted from the processing of the representative event described herewith. It is seen that the decision that was made in the new activity process/activity 230 resulted in a new process/activity 320 being entered into the architecture, to represent further processing by the exercise participant in Swimlane 5.

When the participant completed the effort represented by process/activity/Petri node 320, a message was sent back into the rest of the system to process/activity 287 to continue processing of the architecture described in this DoDAF OV-6C architectural drawing. Now that the processing required by the participant in Swimlane 5 has been recorded, described, and timed, resulting in processes/activities 230 and 320 and their associated messages, the complete executable architecture diagram can be provided for further analysis of the overall mission. The executable architecture can now be run in faster than real time, benefiting from the information about the processing in Swimlane 5 to provide a better simulation of the overall architecture.

It will be understood that hard copy illustrations of the processing, or screens, such as illustrated in FIG. 2, 3, 4, 6 or 7 can be created using printer 22. It will also be understood that participants, such as actor or user U can achieve greater proficiency in carrying out a mission or assignment as a result of interacting with a system such as system 10.

System 10 enables the capture of modifications or improvements to current or projected mission processes, including activities, business rules, sequences, state transitions, information exchanged, etc. in architecture data. Such systems and methods also apply to the interaction of systems, system functions, and the data they exchange, and associated communications in support of the processes. Thus although the example presented in the application is a Business Process Model Notation version of a DoDAF OV-6C Operational Event Trace, the system can also support change and update to a full range of both operational and systems DODAF architecture products—diagrams, matrices, etc. (OV-1, 2, 3, 5, 6a, and 6b and SV-1, 2, 3, 4, 5, 6 and 10). These data and diagrams in turn can be incorporatable or translated into documents and publications that will change or update standardized guidance such as business rules, tactics, techniques and procedures that govern the conduct of enterprises and organizations as well as documents supporting portfolio management, acquisition, etc.

The participant can use different means of communication to send messages to the rest of the system. In an embodiment, a communications-network simulator provides simulation of the timing delays that are present in an implementation of the actual system described in the architecture. The communications delays are inserted on a message-by-message basis, depending on the message path, type of communication system, and the amount of other communications traffic that is occurring. This capability can be used to provide the participant with a better simulation of the rest of the architecture.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A system comprising:
    an events capturing tool (ECT) configured to generate data identifying actions taken by a human in response to events, and timing of the actions for use in an executable architecture;
    a display unit;
    a network interface adapted to communicate with a network; and
    a programmable processor coupled to the display unit and configured to:
        receive an event message from a simulator coupled to the network;
        based on the event message, access a model, wherein the model identifies a plurality of events that may be encountered by a participant, and identifies for at least some of the plurality of events a corresponding plurality of actions which may be taken by the participant when encountering a corresponding one of the plurality of events;
        identify the plurality of events on the display unit;
        in response to the participant encountering the corresponding one of the plurality of events, receive a first input identifying the corresponding one of the plurality of events encountered by the participant;
        in response to the first input, generate a first message that identifies the corresponding one of the plurality of events and a time associated with receipt of the first input; and
        transmit the first message to a downstream simulator coupled to the network.

2. The system of claim 1, wherein the processor is further configured to:
    access the model to obtain the plurality of actions corresponding to the corresponding one of the plurality of events;
    identify the corresponding plurality of actions on the display unit;
    in response to the participant choosing one of the plurality of actions, receive a second input identifying the one of the plurality of actions; and
    in response to the second input, generate a second message that identifies the one of the plurality of actions and a time associated with receipt of the second input.

3. The system of claim 2,
    wherein the processor is further configured to transmit the second message to the downstream simulator coupled to the network.

4. The system of claim 1, wherein the processor is further configured to generate and store an operation event trace identifying the one of the plurality of events.

5. A method for coupling a live simulation into an executable architecture comprising a discrete simulator, wherein the discrete simulator simulates a scenario via a plurality of automated operational nodes, wherein an automated operational node receives a first message from an upstream automated operational node and in response thereto sends a second message after a predetermined period of time to a downstream automated operational node to simulate a particular event in the scenario, the method comprising:
    replacing one of the plurality of automated operational nodes with an exercise monitoring unit (EMU) comprising a display unit, an input device, and a programmable processor;
    generating, by an events capturing tool (ECT), data identifying actions taken by a human in response to events, and timing of the actions for use in the executable architecture;
    sending to the EMU from a first automated operational node the first message;
    receiving by the EMU the first message, and based on the first message:
        accessing a model, wherein the model identifies a plurality of events that may be encountered by a participant and identifies for at least some of the plurality of events a corresponding plurality of actions which may be taken by the participant when encountering a corresponding one of the plurality of events;
        identifying the plurality of events on the display unit;
        in response to the participant encountering one of the plurality of events, receiving a first input via the input device identifying the one of the plurality of events encountered by the participant; and
        in response to the first input, transmitting the second message to a second automated operational node identifying the one of the plurality of events and a time associated with receipt of the first input.

6. The method of claim 5, further comprising:
    accessing the model to obtain the plurality of actions corresponding to the one of the plurality of events;
    identifying the plurality of actions on the display unit;
    in response to the participant choosing one of the plurality of actions, receiving a second input via the input device identifying the one of the plurality of actions; and
    in response to the second input, transmitting a third message to the second automated operational node identifying the one of the plurality of actions and a time associated with receipt of the second input.

7. The method of claim 6, wherein the third message further identifies a duration between receipt of the first input identifying the one of the plurality of events encountered by the participant and receipt of the second input identifying the one of the plurality of actions.

8. The method of claim 6, further comprising storing, in the EMU, data identifying the first input identifying the one of the plurality of events encountered by the participant, the second input identifying the one of the plurality of actions, and a duration between receipt of the first input and the second input.

9. The method of claim 6, wherein the one of the plurality of events encountered by the participant comprises a fired-upon event, and wherein the one of the plurality of actions comprises an engage action.

10. The method of claim 9, further comprising storing, in the EMU, data identifying the fired-upon event, data identifying the engage action, and data identifying a duration of time between receiving the first input identifying the fired-upon event and the second input identifying the engage action.

11. The method of claim 6, wherein the executable architecture further comprises a plurality of swimlanes, each of the plurality of swimlanes corresponding to a different one of the plurality of automated operational nodes, and wherein the EMU corresponds to a particular swimlane of the plurality of swimlanes that is different from each of the other swimlanes in the plurality of swimlanes.

12. The method of claim 5, wherein the first automated operational node is different from the second automated operational node.

13. The method of claim 12, wherein the second automated operational node is idle until the second message is transmitted to the second automated operational node.

14. The method of claim 5, wherein the model comprises a Markov model.

15. The method of claim 14, wherein the Markov model is based on a plurality of previous inputs identifying corresponding previous events encountered by one or more previous participants in previous simulations of the scenario.

16. A method for coupling a live simulation into an executable architecture comprising a discrete simulator, wherein the discrete simulator simulates a scenario via a plurality of automated operational nodes, wherein an automated operational node receives a first message from an upstream automated operational node and in response thereto sends a second message after a predetermined period of time to a downstream automated operational node to simulate a particular event in the scenario, the method comprising:

replacing one of the plurality of automated operational nodes with an exercise monitoring unit (EMU) comprising a display unit, an input device, and a programmable processor, wherein the executable architecture further comprises a plurality of swimlanes, each of the plurality of swimlanes corresponding to a different one of the plurality of automated operational nodes, and wherein the EMU corresponds to a particular swimlane of the plurality of swimlanes that is different from each of the other swimlanes in the plurality of swimlanes;

sending to the EMU from a first automated operational node the first message;

receiving by the EMU the first message, and based on the first message:

accessing a model, wherein the model identifies a plurality of events that may be encountered by a participant and identifies for at least some of the plurality of events a corresponding plurality of actions which may be taken by the participant when encountering a corresponding one of the plurality of events;

identifying the plurality of events on the display unit;

in response to the participant encountering one of the plurality of events, receiving a first input via the input device identifying the one of the plurality of events encountered by the participant; and in response to the first input, transmitting the second message to a second automated operational node identifying the one of the plurality of events and a time associated with receipt of the first input.

\* \* \* \* \*